Jan. 5, 1932.  J. R. KNOX  1,839,765
TEAT CUP OF MILKING MACHINES
Filed Nov. 19, 1929

Inventor
Joseph Rogers Knox
By H. B. Willson &co
Attorneys

Patented Jan. 5, 1932

1,839,765

UNITED STATES PATENT OFFICE

JOSEPH ROGERS KNOX, OF READING, ENGLAND, ASSIGNOR OF ONE-HALF TO GEORGE HARRY GASCOIGNE, OF QUEENSMERE, WOKINGHAM, BERKSHIRE, ENGLAND

TEAT CUP OF MILKING MACHINES

Application filed November 19, 1929, Serial No. 408,322, and in Great Britain December 7, 1928.

This invention relates to teat cups for use in association with milking machines, and refers more especially to such devices of the kind comprising a rigid shell or casing with a flexible liner and wherein the interior of the liner is subjected to suction and the space between the casing and the liner to pulsations of pressure or suction.

When the same degree of vacuum exists on both sides of the liner the liner remains in the cylindrical form. When the vacuum (or partial vacuum) exists inside the liner and atmospheric pressure is admitted to the outer space the liner collapses or flattens, thereby squeezing the teat of the cow being milked.

It has been found as would be expected, that the liner when new flattens along the diameter which offers the least resistance to collapse, and henceforth continues at each pulsation to flatten along this particular diameter.

The rubber, or other flexible material used for the liner, is therefore highly stressed at the extreme edges of the flattened portion, due to the continual bending action to which these parts are subjected. After a period of use fatigue of the material results and cracking develops along the edges of the flattened portion.

When the teat cup is in operation on the cow's teat, the teat occupies the top end of the liner. The upper end of the liner is therefore held in approximately cylindrical shape by the teat.

The bottom end of the liner as in the case of tensioned liners, is held permanently in circular shape by one of the various arrangements used for the clamping of the liner to the rigid shell. In the case of non-tensioned liners similar to that described in Patent Specification No. 285,233, the bottom end of the liner is held in circular shape by the thick walled milk tube, which is formed in one piece with the liner.

From the foregoing it will be seen that the collapsing of the liner takes place between the point where the cow's teat holds the liner in circular form and the bottom end of the liner and the most severe bending stress is set up between these two points. It is between these two points that the cracking occurs.

The object of the present invention is to provide a means whereby the diameter along which the flattening or collapsing takes place may frequently be changed, thereby preventing the stressing of the liner being localized at two opposite points on the circumference.

According to this invention, therefore, a teat cup is provided in which the flexible liner is adapted to flatten or collapse along a diameter determined by the relative positions of the said liner and the outer rigid shell.

This is preferably effected by forming or providing the said outer rigid shell with means for producing an initial or partial flattening of the flexible liner when the latter is operatively engaged therein and such means may take the form of two flats or indentations formed in opposite sides of said shell.

When the liner is in the uncollapsed form these flats or indentations press on the walls of the liner and constrain it to assume a shape of oval cross-section over part of its length, usually at a suitable point below that to which the cow's teat extends within the liner when the teat cup is in operation. When the liner is in this shape it is found that it will collapse along the major axis of the oval.

A teat cup constructed in accordance with the invention will now be more fully described with reference to the accompanying drawings, wherein:—

Figure 1:
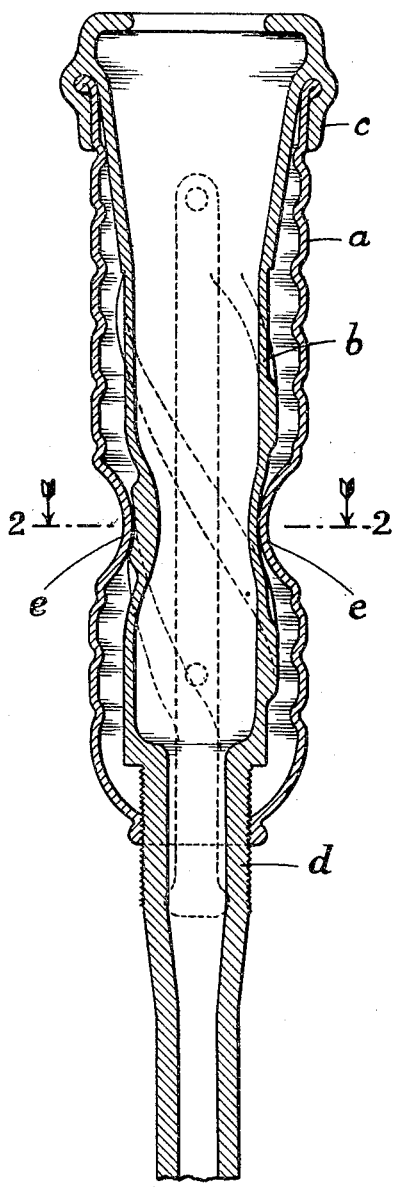
Fig. 1 is a longitudinal section of the teat cup.

In the drawings the outer rigid shell $a$ is shown as fitted with a flexible liner $b$ of the kind described in Patent Specification No. 285,233, the lip $c$ formed on the upper end of the liner taking over the upper end of the shell or casing $a$ and the lower end $d$ of the liner forming a close push fit in the opening at the lower end of the casing.

Figure 2:
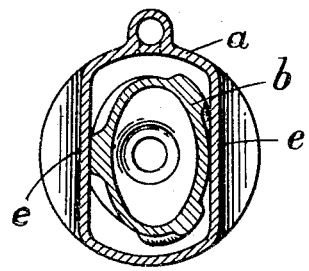
Fig. 2 is a horizontal section thereof taken on the line 2—2 of Fig. 1.

At a suitable point below the end of the cow's teat (not shown) two flats or indentations $e, e$ are formed in the wall of the shell $a$ on opposite sides, these flats *e* pressing on the liner *b* when it is in the uncollapsed form and forcing it to assume a shape of approximately oval cross-section (see Fig. 2). As will be understood the liner, when in this shape, will collapse along the major axis of the oval.

Now each time the liner *b* is taken out of the shell *a* and afterwards replaced the chances are very much in favor of it being replaced in the shell in a different position in relation to the two flats or indentations *e* on the shell. The oval cross-section will then be formed each time so that its major axis runs a different way, and it will therefore be apparent that the stressing of the liner will be distributed all round the circumference.

Instead of two flats *e* being formed on the outer rigid shell *a*, the shell may be made in any form which will constrain the liner *b* to assume an oval or similar cross-section when in the unflattened state.

This invention is applicable to teat cups with liners of the tensioned type as well as to liners of the nontension type such as illustrated.

I claim:

1. A teat cup for use in association with milking machines comprising a rigid shell, a collapsible flexible liner disposed within said shell and adapted to engage by an upper unrestricted portion of its length over the teat being milked, and fixedly disposed inwardly extending portions on said shell contacting over a comparatively small area with a lower portion of the liner in order to impart an initial flattening thereto in the direction in which said liner is to collapse during the milking operation.

2. A teat cup of the class described comprising a rigid shell, a collapsible flexible liner disposed within said shell and adapted to engage by an upper unrestricted portion of its length over the teat being milked, and indentations in said shell providing inwardly extending portions each engaging the said liner over a comparatively small area, at a point below that to which the teat extends within the liner, in order to impart an initial flattening to the said liner in the direction in which the same is to collapse during the milking operation.

3. A teat cup of the class described comprising a rigid shell of substantially cylindrical form, a collapsible flexible liner disposed within said shell and adapted to be held in substantially cylindrical form at its upper end by the insertion therein of the teat to be milked, means for holding the lower end of said liner in substantially cylindrical form, and diametrically opposed flats formed in the rigid shell so that they engage the liner between the ends thereof, over a comparatively small area, and impart a slight flattening to said liner, below the point to which the teat extends therewithin, in that direction in which the liner is to collapse during the milking operation.

4. A teat cup of the class described comprising a rigid shell of substantially cylindrical form, a collapsible flexible liner disposed within said shell, an upper unrestricted portion of said liner held in substantially cylindrical form by a teat inserted therein, a lower portion of said liner adapted to be collapsed, means holding the lower end of said lower portion in substantially cylindrical form, and indentations formed in the rigid shell to produce diametrically opposite flats in the interior thereof adapted to engage the lower portion of the flexible liner over a comparatively small area and produce a slight initial flattening of the liner in that direction in which said liner is to collapse during the milking operation.

In testimony whereof he has affixed his signature.

JOSEPH ROGERS KNOX.